March 18, 1941.　　O. O. TETERS ET AL　　2,235,341
VEHICLE BRAKE
Filed Nov. 30, 1939　　2 Sheets-Sheet 1
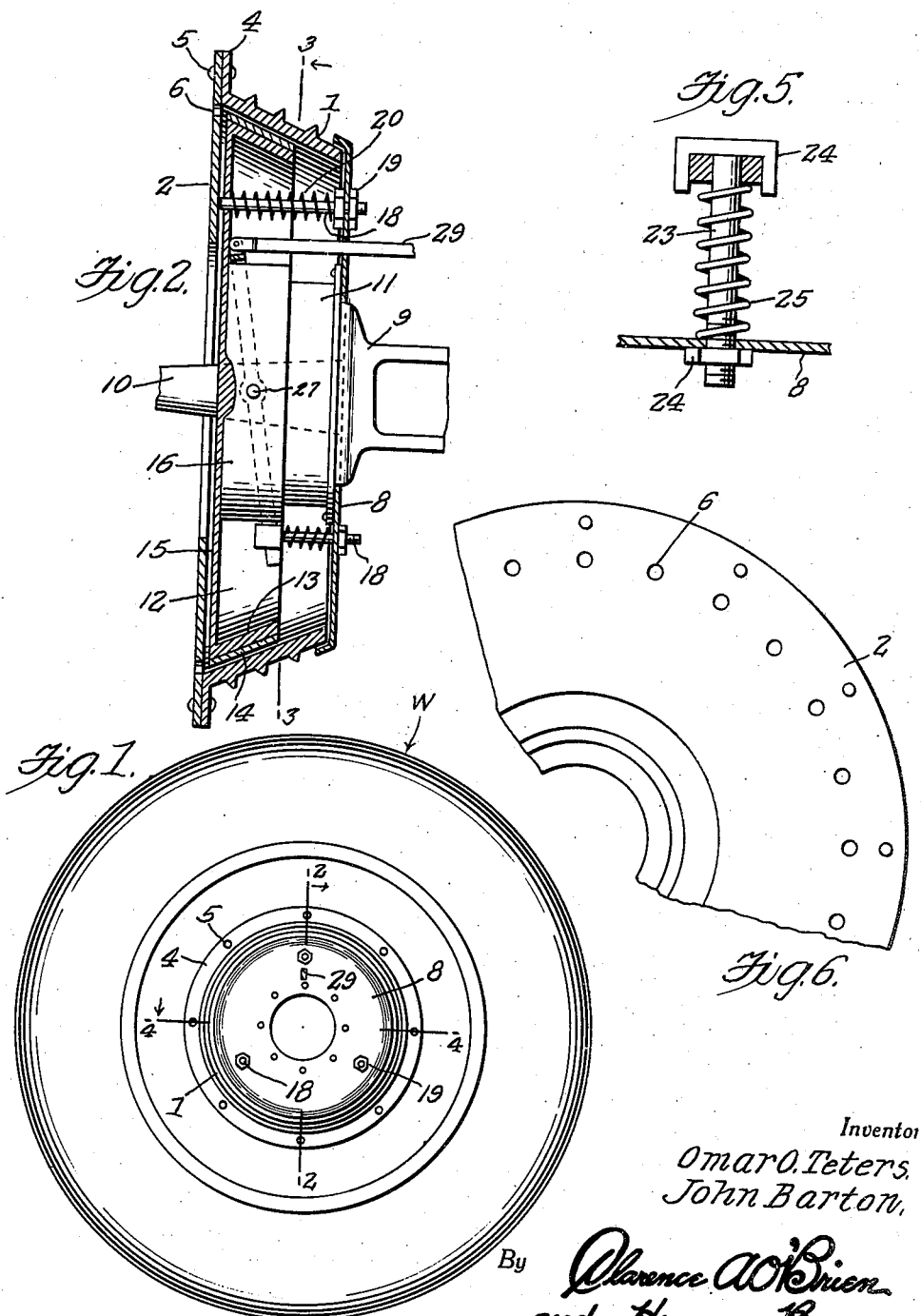

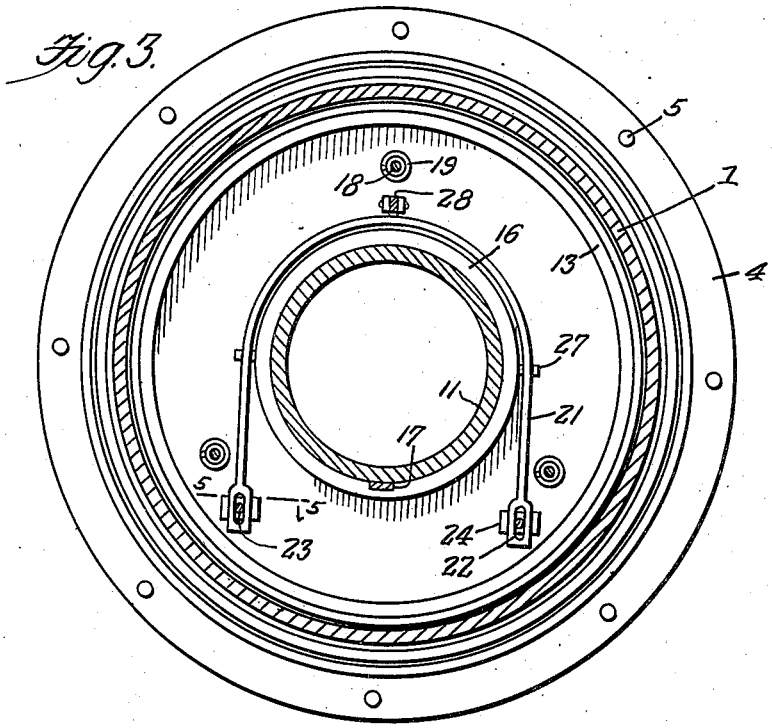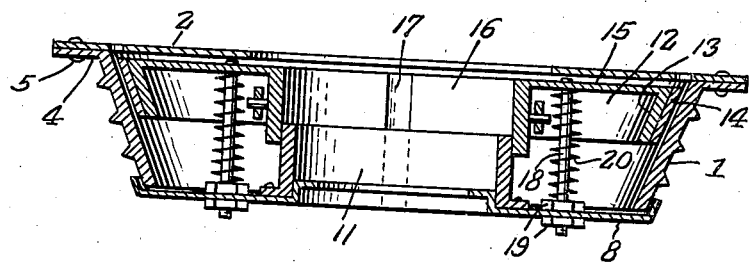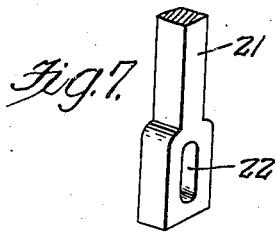

Patented Mar. 18, 1941

2,235,341

UNITED STATES PATENT OFFICE 2,235,341

VEHICLE BRAKE

Omar Orson Teters and John Barton, St. Louis, Mo.

Application November 30, 1939, Serial No. 306,922

1 Claim. (Cl. 188—71)

This invention relates to a vehicle brake, the general object of the invention being to provide a tapering brake drum for each wheel of the vehicle.

The braking member is a brake wheel within the drum, the periphery of this brake wheel tapers inwardly to conform with the taper of the drum.

This brake wheel does not revolve but slides to and from the axle base upon the housing with mechanical operated means for moving the brake wheel toward the small end of the drum so that the tapering part of the brake wheel will engage the interior tapered surface of the drum to set up a braking action and thus stop the rotary action of the drum and the transit wheel attached thereto.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which—

Figure 1 is a view looking toward the inner face of a wheel assembly constructed in accordance with this invention.

Figure 2 is a section on the line 2—2 of Figure 1.

Figure 3 is a section on the line 3—3 of Figure 2.

Figure 4 is a section on the line 4—4 of Figure 1.

Figure 5 is a section on the line 5—5 of Figure 3.

Figure 6 is a fragmentary view of the front closure plate of the drum.

Figure 7 is a perspective view of one end of the U-shaped actuating lever of the brake applying means.

In these views the numeral 1 indicates a brake drum which tapers from its outer end to its inner end and the numeral 2 indicates the front cover plate which is fastened to a flange 4 at the outer end of the drum by bolts 5, said plate having a centrally arranged opening therein and also having an annular row of holes 6 adjacent the periphery of the interior part of the drum for the escape of moisture and foreign matter by centrifugal force as the drum revolves.

The inner or stationary plate is shown at 8 and is suitably fastened to the axle 9 to which the wheel carrying spindle 10 is connected, the wheel being shown at W in Figure 1 and said wheel is suitably connected with the drum so that the drum will rotate with the wheel. A false housing 11 extends into the drum from the backing plate 8, this false housing only being used for the front wheels as the rear brakes slide back and forth on the rear axle housing for the rear wheels. The braking wheel or member 12 is made in the form of a circular member with the peripheral part 13 tapering inwardly to conform to the taper of the drum and this part carries the lining 14 on its outer circumference and a disk 15 connects the part 13 with the circular hub part 16 which fits over the housing 11 for sliding movement thereon and is keyed thereto as shown at 17 so that the braking member is held against rotary movement. Rods 18 are carried by the backing plate 8 and extend into the drum and pass through holes in the disk 15 and are attached to the plate 8 by the inner and outer nuts 19. A coil spring 20 is placed on each rod and bears against the inner nut and the inner face of the disk 15 and tends to hold the braking member with its lining out of contact with the drum.

A U-shaped lever 21 has the ends of its limbs enlarged and provided with the slots 22, see Figure 7, and T-shaped bolts 23 have their channel-shaped heads 24 engaged to these enlarged ends with the ends fitting in the channels of the heads 24 and the stems of the bolts passing through the slots 22 and the threaded parts of these bolts pass through the backing plate 8, see Figure 5, where they receive the nuts 24. A spring 25 is placed on the stem of each bolt and bears against the plate 8 and the enlarged end of the lever to prevent rattling or undue movement of the parts. Intermediate portions of the limbs of the lever are pivoted to the pins 27 projecting from diametrically opposite points of the hub 16 and an ear is formed on the bight of the lever as shown at 28. An operating rod 29 is pivoted to this ear and passes through a hole in the backing plate and is adapted to connect it to suitable operating means so that the operator of the vehicle can exert a pull on the member 29 to cause the lever to shift the braking member inwardly so as to place the lining 14 against the inner wall of the brake drum to check or stop movement of the drum and the wheel. Of course, as soon as this pressure is released the springs 20 on the rods 13 move the braking member 12 back to releasing position.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A brake device comprising a drum tapering from one end to the other, a brake member in the drum having a peripheral portion tapering from one end to the other and conforming to the taper of the drum, spring means for normally holding the brake member out of engagement with the drum, means for supporting the brake member for sliding movement but against rotary movement, a U-shaped lever having intermediate portions of its limbs pivotally connected with the brake member, pivotal means for connecting the ends of the lever with a stationary part of the device and manually operated means connected with the bight part of the lever for moving the same in a direction to cause the brake member to engage the drum, said pivotal means for the ends of the limbs of the lever including T-bolts connected with the stationary part and the ends of the lever having slots therein receiving the bolts and the heads of the bolts being of channel form to receive portions of the ends of the lever and spring means on the bolts engaging the stationary part and the ends of the lever.

OMAR ORSON TETERS.
JOHN BARTON.